Patented Aug. 3, 1954

2,685,602

UNITED STATES PATENT OFFICE 2,685,602

ALKENE PHOSPHONOUS DICHLORIDES AND METHODS OF MAKING THE SAME

Willard H. Woodstock, Crete, and Edward N. Walsh, Chicago Heights, Ill., assignors to Victor Chemical Works, a corporation of Illinois No Drawing. Application March 19, 1953, Serial No. 343,485

9 Claims. (Cl. 260—543)

This invention relates to alkene phosphonous dichlorides and methods of making the same.

It is well known that unsymmetrical olefins, having a terminal double bond, react with $PCl_5$ to form phosphorus addition products. These products are generally 2-chloroalkane phosphonic tetrachlorides although in some instances hydrogen chloride is lost during the reaction so that alpha-beta unsaturated alkene phosphonic tetrachlorides result. These tetrachlorides have great utility themselves, but until the method of this invention, which involves the use of elemental phosphorus as a reducing agent in the presence of iodine as a catalyst, no way was known of reducing the phosphorus atom to the trivalent state and thereby affording an even more versatile and valuable compound.

Olefins which are suitable for the preparation of the starting organic phosphorus tetrachlorides of the present invention may be represented by the formula $RR'C:CH_2$ in which R is hydrogen, alkyl or aryl, and R' is alkyl or aryl. Thus, suitable olefins include propylene, butene-1, isobutylene, di-isobutylene, 2,2-diphenylethylene, styrene, and the like. The reaction is thought to proceed in one or more of the following ways:

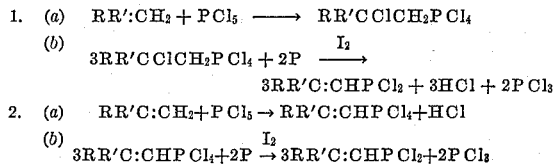

where R and R' are defined as in the preceding discussion.

As can be seen, the phosphorus tetrachloride compounds set out in the above reactions have the formula $APCl_4$ wherein A is an alkenyl, aralkenyl or chloroalkyl radical.

It can be seen from the above equations that the only difference in the two reactions lies in the point at which HCl is lost. It is immaterial, therefore, for the process of this invention, whether the organic phosphorus tetrachloride to be reduced is in reality an alkenyl phosphorus tetrachloride or a chloroalkyl phosphorus tetrachloride. The product in either case is an alkene phosphonous dichloride and the actual phosphorus reduction mechanism, through the use of an iodine catalyst, is apparently identical.

The products of the second reaction may be separated by distillation to give the pure alpha, beta unsaturated alkene phosphonous dichloride. This versatile intermediate may be reacted with alcohols or phenols to produce esters, with organic or inorganic bases to form salts, with ammonia or amines to produce amides, with sulfur to produce the corresponding thiono compound, and with water to give the corresponding phosphonous acid.

The following examples illustrate the process of the invention. In each example the reaction took place in a one liter, three neck flask equipped with an oil sealed stirrer, dropping funnel, thermometer, and vent line including a calcium chloride tube to prevent entrance of atmospheric moisture. An ice-bath for regulating the temperature was also provided. A $CO_2$ atmosphere was used at all times during the phosphorus addition.

*Example 1.*—To the reaction flask were added 172 gm. $PCl_5$ and 414 ml. of $PCl_3$ to serve as both solvent and diluent. The mixture was cooled to 0° C. and 185 gm. (100% mole excess) of di-isobutylene was added dropwise over a period of 1½ hours while stirring constantly, and controlling the temperature below 0° C. The stirring was then stopped and the mixture allowed to stand for one hour at below 0° C. to complete the formation of 2-chloro-octane phosphorus tetrachloride. There was no evidence of hydrogen chloride evolution. The flask was then flushed with $CO_2$ and 17.1 gm. of solid yellow phosphorus and approximately 0.2 gm. iodine crystals were added to the mixture while maintaining the $CO_2$ atmosphere. No temperature increase was noted so the mixture was allowed to warm to room temperature during which time hydrogen chloride was evolved and a characteristic red color developed. The temperature rose to 30° C. in approximately forty minutes and was held there for ½ hour during which time the solution cleared. The temperature was then raised and held at 60° C. for one hour and then 70° C. for 1½ hours and then left to cool to room temperature overnight. The mixture was distilled under vacuum yielding 107 gm. of isooctene phosphonous dichloride with a boiling point of 67–70° C. at 2 mm. of mercury pressure. This product analyzed 14.0% P and 37.7% Cl compared with the theoretical values of 14.5 and 33.3.

*Example 2.*—417 gm. $PCl_5$ and 750 ml. of benzene to serve as diluent, were added to a three neck reaction flask. The mixture was cooled to 2° C. and 428 g. (100% mole excess) of di-isobutylene were added over a period of 1½ hours keeping the temperature below 0° C. The mixture was stirred for one hour at −4° C. and the flask then flushed with $CO_2$. Approximately 0.2 gm. of iodine crystals was then added followed by a solution of 41.3 gm. of yellow phosphorus dissolved in 8 ml. of carbon disulfide. The mixture was stirred for four hours at below 0° C. and then allowed to rise to 20° C. and stand in an ice-water bath overnight. The product was then distilled using an ice-water cooled condenser to give 281 gm. of isooctene phosphonous dichloride having a boiling point of 70–72° C. at 2–3 mm. of mercury pressure. The product analyzed 14.6% P, 33.1% Cl and had an index of refraction $N_D^{25}=1.5035$.

*Example 3.*—417 gm. of $PCl_5$ and 1000 ml. of $PCl_3$ were added to a two liter reaction flask and the mixture cooled to 0° C. using an ice-salt bath. 178 gm. of isobutene (60% mole excess) were first condensed and then allowed to slowly boil so that the vapors produced passed into the flask and over the reaction mixture. The reaction mixture was stirred during the addition which required 2½ hours at less than 0° C. The mixture was stirred for another hour at 0° C. to complete the formation of the 2-chlorobutane phosphorous tetrachloride, after which the flask was flushed with $CO_2$. Approximately 0.2 gm. of iodine crystals was then added followed by 41.3 gm. of yellow phosphorus dissolved in 8 ml. of carbon disulfide. No reaction was observed so the mixture was warmed to 25° C. during 1 hour, to 45° C. during ½ hour and to 60° C. during 1½ hours. The reaction was not complete so it was stirred overnight at 25° C. which produced a clear red liquid. This was heated at 60° C. for 1 hour and then distilled to give 212.2 gm. of isobutene phosphonous dichloride having a boiling point of 98–108° C. at 100 mm. absolute pressure and an index of refraction $N_D^{25}=1.5087$. This product analyzed 18.5% P, 48.0% Cl (theoretical 19.7% and 45.2% respectively).

*Example 4.*—208.5 gm. of $PCl_5$ and 500 ml. of $PCl_3$ as a diluent were added to the reaction flask and cooled to 10° C. 208 gm. (100% mole excess) of styrene was then added over a two hour period keeping the temperature below 20° C. during the formation of the 2-chloro-styryl phosphorus tetrachloride. An additional 250 ml. of $PCl_3$ was added to keep the mixture from becoming too thick. The flask was then flushed with $CO_2$ and approximately 0.2 gm. of iodine crystals added. 20.6 gm. of yellow phosphorus dissolved in 4 ml. of carbon disulfide were then added over a 30 minute period allowing the temperature to rise to 45° C. The mixture was then heated to 60° C. for 1½ hours and then to 75° C. for 1½ hours and allowed to cool to room temperature overnight. Distillation of the mixture gave 110 gm. of styrene phosphonous dichloride with a boiling point of 135–138° C. at 8 mm. absolute pressure, index of refraction $N_D^{25}=1.6350$ and analyzing 15.1% P and 34.9% Cl (theoretical 15.1% and 34.7% respectively).

*Example 5.*—417 g. (2.0 moles) $PCl_5$ and 1000 ml. benzene were added to the reaction flask and cooled to below 5° C. 182 g. (30% excess) 1-pentene was then added dropwise over a period of 45 minutes while controlling the temperature below 5° C. The mixture was further reacted by stirring for two hours at 0–5° C. Small amounts of HCl were evolved during this time. The chloropentane phosphorus tetrachloride thus formed was reduced by adding 41.4 g. yellow phosphorus dissolved in 12 ml. $CS_2$, and 0.3 g. iodine crystals as a catalyst. The mixture was stirred at 10° C. for one hour and 15–17° C. for two hours and then allowed to warm to room temperature. The mixture was transferred to a glass distilling apparatus and the product was distilled collecting the material boiling at 100–102° C. vapor temperature at 100 mm. absolute pressure. This product, pentene phosphonous dichloride, had an index of refraction, $N_D^{25}=1.5028$.

Using equipment and procedure as outlined in the above examples, an attempt was made to repeat the reaction using di-isobutylene but without the iodine catalyst. Despite prolonged reaction periods during which the reactants were heated at 60° C. for two hours and then 70° C. for two additional hours, no alkene phosphonous dichloride could be recovered. In none of the cases tried has this reaction been possible without the use of the iodine catalyst.

It can be easily seen that reaction conditions may be varied over a wide range without adversely affecting the improved results obtained by use of the iodine catalyst of the present invention. Thus the method used to prepare the organic phosphorus tetrachloride is immaterial insofar as the subsequent reduction of this compound with phosphorus using the iodine catalyst is concerned. It is preferred, however, to use the method shown in the examples wherein the olefin and $PCl_5$ are reacted and, without separation of the reaction product, are immediately reduced to the alpha, beta unsaturated alkene phosphonous dichloride.

The quantity of iodine crystals used is not critical since the action of the iodine is truly catalytic. The examples show amounts varying from approximately 0.02% to 0.05% of the weight of the reactants. Other experiments have shown that as high as 0.25% catalyst does not improve the yields. Since a mere trace of iodine is sufficient, the percentage as compared to the total weight of reactants will decrease when larger charges are made.

For forming the $PCl_5$-olefin reaction products, benzene and $PCl_3$ are shown as the preferred solvents, but chlorinated benzenes, toluene, carbon tetrachloride, etc. may also be used. Excess olefin ranging up to 100% of theoretical will give good yields with the best results obtained using substantially 100% excess. The temperature during the olefin addition has been allowed to go as high as 30° C. but the preferred range is near 0° C. where best results are obtained. The time required for this addition is not critical and will depend on the amount of excess olefin used, the temperature range selected and the efficiency of the cooling equipment.

The reduction of the organic phosphorus tetrachloride with the phosphorus will likewise proceed satisfactorily under a wide range of variables. The phosphorus itself may be added either as a solid or in the form of a carbon disulfide solution. Low temperatures near 0° C. are preferred for this reaction but temperatures up to 25° C. have been used successfully. The reaction period following the phosphorus addition may be extended up to two days without harm. The mixture is preferably heated to 50–60° C. to complete the reaction with temperatures as high as 80° C. being satisfactory. The separation of the product by means of distillation under reduced pressure is a routine procedure.

Elemental iodine is not the only catalyst that can be used in this invention as other compounds that liberate iodine under the conditions of the reaction are also suitable. These compounds include potassium iodide, calcium iodide, phosphorus tri-iodide, iodine monochloride, and similar compounds.

The foregoing detailed description has been given for clearness of understanding only, and no unnecessary limitations should be understood therefrom, for modifications will be obvious to those skilled in the art.

We claim:

1. The method of making an alpha, beta unsaturated alkene phosphonous dichloride which comprises reducing the reaction product of $PCl_5$ and an olefin of the formula $RR'C=CH_2$, wherein R is a member of the class consisting of hydrogen, alkyl and aryl, and R' is a member of the class consisting of alkyl and aryl, with elemental phosphorus in the presence of catalytic amounts of iodine.

2. The method of claim 1 wherein the olefin is isobutylene.

3. The method of claim 1 wherein the olefin is di-isobutylene.

4. The method of claim 1 wherein the olefin is styrene.

5. The method of claim 1 wherein the initial reaction with phosphorus is conducted at a temperature of about $-10$ to $25°$ C. followed by a further reaction at a temperature not exceeding about $80°$ C. for a time sufficient to complete the reaction, the iodine is present in an amount of about 0.01% to 0.1% by weight, and the alkene phosphonous dichloride is separated by distillation.

6. As a new compound, an alpha, beta unsaturated alkene phosphonous dichloride having the formula $RR'C=CHPCl_2$ wherein R is a member of the class consisting of hydrogen, alkyl and aryl and R' is a member of the class consisting of alkyl and aryl.

7. As a new compound, isobutene phosphonous dichloride.

8. As a new compound, iso-octene phosphonous dichloride.

9. As a new compound, styrene phosphonous dichloride.

No references cited.